United States Patent [19]

Sakurada et al.

[11] Patent Number: 4,842,047
[45] Date of Patent: Jun. 27, 1989

[54] AIR CONDITIONER FOR AUTOMOBILES

[75] Inventors: Muneo Sakurada, Konan; Yuusuke Takahashi, Higashi-matsuyama, both of Japan

[73] Assignee: Diesel Kiki Co., Ltd., Tokyo, Japan

[21] Appl. No.: 201,966

[22] Filed: Jun. 3, 1988

[51] Int. Cl.$^4$ ............................................. G05D 23/13
[52] U.S. Cl. ......................................... 165/43; 62/244; 98/2.11; 236/13
[58] Field of Search ................ 62/244; 98/2.11; 165/42, 43; 236/13

[56] References Cited

U.S. PATENT DOCUMENTS

| | | | |
|---|---|---|---|
| 3,994,335 | 11/1976 | Perkins | 236/13 X |
| 4,460,036 | 7/1984 | Yoshimi et al. | 165/42 X |
| 4,513,808 | 4/1985 | Ito et al. | 165/42 X |
| 4,586,652 | 5/1986 | Sakurai | 62/244 X |
| 4,681,153 | 7/1987 | Uchida | 265/42 X |
| 4,718,244 | 1/1988 | Kobayashi | 62/244 X |

Primary Examiner—William E. Tapolcai
Attorney, Agent, or Firm—Wenderoth, Lind & Ponack

[57] ABSTRACT

An air conditioner for automobiles includes a pair of juxtaposed air flow passages commonly containing blowers and heat exchangers. Each of the air flow passages is provided with a bypass door and an air distribution door. At least one of the bypass door and the air distribution door in one air flow passage is operative independently of the bypass door and the air distribution door in the other air flow passage so that the temperature of air flowing through one air flow passage can be controlled independently of the temperature of air flowing through the other air flow passage.

4 Claims, 3 Drawing Sheets

AIR CONDITIONER FOR AUTOMOBILES

BACKGROUND OF THE INVENTION

1. Field of the Invention:

The present invention relates generally to air conditioners adapted to be installed in automotive vehicles, and more particularly to an automobile air conditioner for conditioning the temperature of the air in the driver's seat side and the temperature of the air in the assistant driver's seat side of the vehicle, independently of each other.

2. Description of the Related Art:

One example of an automobile air conditioner of the type described above is disclosed in Japanese Utility Model Application No. 61-185873 filed by the present assignee. The disclosed air conditioner, as illustrated here in FIGS. 5 and 6 of the accompanying drawings, includes two juxtaposed air flow passages 3a, 3b connected at their downstream ends to an air distribution chamber 17 and containing a pair of independently controllable blowers 10a, 10b disposed, respectively, adjacent the upstream ends of the air flow passages 3a, 3b, and further containing a heat exchanger 12 for cooling and heat exchangers 13a, 13b for heating sequentially disposed, adjacent the downstream ends of the air flow passages 3a, 3b. The cooling heat exchanger 12 extends transversely across the two air flow passages 3a, 3b. The heating heat exchangers 13a, 13b are disposed in the respective air flow passages 3a, 3b and each receive a controlled quantity of hot water. The rotation of the individual blowers 10a, 10b and the flow quantity of the individual heating heat exchangers 13a, 13b are controlled such that the air in the left side and the right side of a vehicle passenger compartment are air-conditioned independently of each other.

In the automobile air conditioner described above, a pair of independently controllable blowers and a pair of heating heat exchangers must be provided. This arrangement requires complicated wiring and piping, thus making it difficult to construct the air conditioner at a reduced manufacturing cost. Another problem is that since the full reheat-type air conditioner is incapable of controlling the temperature distribution in a vertical direction of the air flow passage, air-conditioning to keep the occupant's head cool and his feet warm is difficult to obtain, particularly when the air conditioner is operating in the bi-level mode.

SUMMARY OF THE INVENTION

With the foregoing problems in mind, it is an object of the present invention to provide an air conditioner for automobiles which has a simple structure and is capable of controlling the temperature in a vehicle passenger compartment both in the horizontal direction and in the vertical direction of the vehicle passenger compartment.

To achieve the foregoing object, there is provided, according to the present invention, an air conditioner for automobiles, comprising:

a casing having defined therein a first air flow passage and a second air flow passage;

a first blower disposed in the first air flow passage;

a second blower disposed in the second air flow passage and controllably drivable independently of the first blower;

a heat exchanger for cooling, disposed downstream of the first and second blowers and extending transversely across the first and second air flow passages;

a heat exchanger for heating, disposed downstream of the cooling heat exchanger and extending transversely across the first and second air flow passages;

a first bypass door disposed in a first bypass passage extending in the first air flow passage along an upper portion thereof and defined by and between a wall of the casing and the heating heat exchanger;

a second bypass door disposed in a second bypass passage extending in the second air flow passage along an upper portion thereof and defined by and between a wall of the casing and the heating heat exchanger;

a first air distribution door disposed in a first air distribution chamber defined in the casing and extending contiguously from the first air flow passage toward a downstream side of the heating heat exchanger, the first air distribution door being operative to separate the first air distribution chamber vertically into an upper portion and a lower portion; and a second air distribution door disposed in a second air distribution chamber defined in the casing and extending contiguously from the second air flow passage toward a downstream side of the heating heat exchange, the second air distribution door being operative to separate the second air distribution chamber into an upper portion and a lower portion.

In this embodiment, when the bypass doors are operated independently of each other to regulate the amount of air flowing through the respective bypass passages, the temperature of air delivered to the upper portion of one air distribution chamber can be regulated independently of the temperature of air delivered to the upper portion of the other air distribution chamber. Even when the air distribution doors are set to a predetermined position corresponding to a selected mode, the blowers are rotated at different speeds to thereby vary the overall quantities of air flowing through the respective air flow passages with the result that the temperature of air varies widely in a vertical direction of the air distribution chambers.

When the air distribution doors are operated independently of each other to vertically separate the air that has passed through the heating heat exchanger, the vertical distribution of air can be controlled each of the air distribution chambers. As a result, the temperature of the upper portion of the air distribution chamber and the temperature of the lower portion of the air distribution chamber is regulatable even when the blowers are driven by a common drive source and when the heat exchangers are used commonly for the two air flow passages.

Many other advantages and features of the present invention will become manifest to those versed in the art upon making reference to the detailed description and the accompanying sheets of drawings in which preferred embodiments incorporating the principles of the present invention are shown by way of illustrative example.

DETAILED DESCRIPTION OF THE PREFERRED EMBODIMENTS

The preferred embodiments of the present invention will be described hereinbelow in detail with reference to the accompanying drawings.

Figure 1:
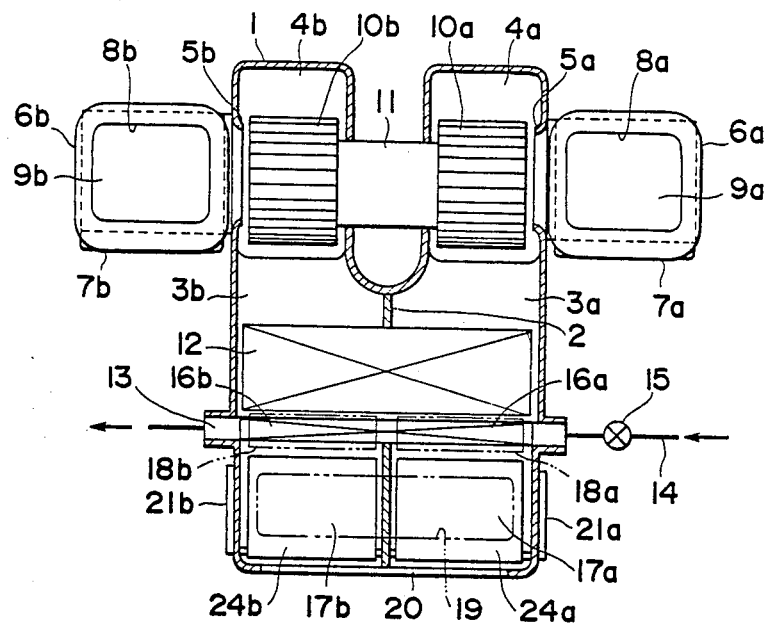
FIG. 1 is a horizontal cross-sectional view of an air conditioner embodying the present invention.
Figure 2:
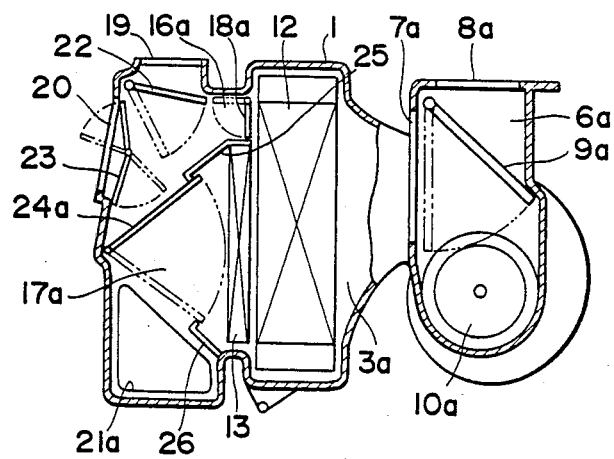
FIG. 2 is a vertical cross-sectional view of the air conditioner.

FIGS. 1 and 2 show a first embodiment of an automobile air conditioner according to the present invention. The air conditioner includes a casing comprising a bifurcated upstream end portion and a substantially rectangular body portion extending downstream of and contiguously from the upstream end portion. The casing 1 includes a vertical partition wall 2 disposed centrally in and extending longitudinally through the body portion so as to define within the casing 1 a pair of juxtaposed (i.e., right and left) air flow passages 3a, 3b extending along the length of the casing 1.

The air flow passages 3a, 3b include a pair of blower receiving chambers 4a, 4b, respectively, at the bifurcated upstream end portion of the casing 1. Each of the blower receiving chambers 4a, 4b communicates through a bellmouthed opening 5a, 5b with one of two intake portions 6a, 6b projecting laterally outwardly from the casing 1. Each of the intake portions 6a, 6b has a recirculated air inlet 7a, 7b and an outside air inlet 8a, 8b provided in a branched fashion, and a changeover door 9a, 9b disposed in the intake portion 6a, 6b to selectively open and close the air inlets 7a, 7b and 8a, 8b. The blower receiving chambers 4a, 4b house therein a pair of blowers 10a, 10b comprising sirocco fans, for example, and driven by a common drive means such as an electric motor 11.

A heat exchanger 12 for cooling and a heat exchanger 13 for heating are sequentially, in the body of the casing 1 and supported by the partition wall 2 so as to extend substantially transversely across the two air flow passages 3a, 3b. The heating heat exchanger 13 is connected with a pipe 14 through which a heating medium is supplied to the heating heat exchanger 13. The amount of heating medium to be supplied to the heating heat exchanger 13 is controlled by a flow control valve 15 disposed in the pipe 14. The upper edge of the heating heat exchanger 13 is spaced from an upper wall of the casing 1 so as to define therebetween a pair of bypass passages 16a, 16b and each disposed on a respective side of the partition wall 2. Thus, the air after having passed through the cooling heat exchanger 12 is allowed to flow through the bypass passages 16a, 16b and the heating heat exchanger 13 into a pair of juxtaposed air distribution chambers 17a, 17b. The air distribution chambers 17a, 17b are defined in the casing 1 contiguously to the downstream ends of the respective air flow passages 3a, 3b. The proportion of air, i.e. the quantity of air flowing through each of the bypass passages 16a, 16b, is regulated by bypass doors 18a, 18b disposed in the bypass passages 16a, 16b.

Each of the distribution chambers 17a, 17b communicates with a defrost air outlet 19 defined in the upper wall of the casing 1, an upper air outlet 20 defined in an upper portion of the front wall (downstream end wall) of the casing 1, and one of a pair of lower air outlets 21a, 21b defined in opposite sidewalls of the casing 1. The defrost air outlet 19 and the upper air outlet 20 are opened and closed by a defrost door 22 and a vent door 23, respectively, that are pivotally supported by the casing 1. The degree to which each of the lower air outlets 21a, 21b is open is dependent on the position of a respective one of a pair of foot doors 24a, 24b pivotally supported by the casing 1.

The defrost door 22 and the vent door 23 extend widthwise of the air distribution chambers 17a, 17b transversely across the partition wall 2 and hence, each of the doors 22, 23 is commonly used for the two air flow passages 3a, 3b. The foot doors 24a, 24b are disposed downstream of the heating heat exchanger 13 in lateral alignment with each other and they are operable independently of each other to move continuously between a fully opened position (indicated by the solid lines in FIG. 2) at which the foot doors 24a, 24b contact an upper guide plate 25 extending obliquely downwardly from the upper edge of the heating heat exchanger 13 to thereby separate each air distribution chamber 17a, 17b vertically into an upper portion and a lower portion, and a fully closed position (indicated by the phantom lines in FIG. 2) at which the foot doors 24a, 24b contact a lower guide plate 26 extending obliquely upwardly from the bottom wall of the casing 1 to thereby fully close the lower air outlet 21a, 21b. The foot doors 24a, 24b thus serve as air distribution doors to distribute the air in a vertical direction of the air distribution chambers 17a, 17b after the air has passed through the heating heat exchanger 13.

During operation, the electric motor 11 is energized to rotate the blower 10a (10b) whereupon the recirculated air or the outside air is drawn into each air flow passage 3a (3b) through one of the air inlets 7a and 8a (7b and 8b) which is selected by the changeover door 9a (9b). The air drawn into the right air flow passage 3a and the air drawn into the left air flow passage 3b are then forced by the respective blowers 10a, 10b to flow downstream along the respective air flow passages without being mixed with each other as they are fed through the cooling heat exchanger 12 and the heating heat exchanger 13 and/or the bypass passages 16a, 16b into the air distribution chambers 17a, 17b. During that time, the temperature of the air flowing in each passage is regulated as desired, and thereafter the temperature-controlled are is blown-off into the vehicle passenger compartment from at least one of the outlets 19, 20, 21a, 21b according the selected operation mode in such a manner that the air flowing from the right air flow passage 3a is discharged from the right side of the air conditioner whereas the air flowing from the left air flow passage 3b is discharged from the left side of the air conditioner.

Since each of the bypass doors 18a, 18b disposed in one of the air flow passages 3a, 3b and each of the foot doors 24a, 24b are operable independently of the other bypass door and the other foot door, the air conditioner is capable of operating in various modes such as those shown in the following Table 1.

TABLE 1

| Mode Door | VENT | | | | | |
|---|---|---|---|---|---|---|
| | MAX VENT | TEM. CONT. MODE | B/L | HEAT | DEF/ HEAT | DEF |
| By-pass | F/O | C | Op-tional | C | Op-tional | C |
| Vent | O | O | O | C | C | C |
| Foot | C | C | Op- | F/O | Op- | C |

TABLE 1-continued

| Mode Door | VENT | | | | | |
|---|---|---|---|---|---|---|
| | MAX VENT | TEM. CONT. MODE | B/L | HEAT | DEF/ HEAT | DEF |
| Defrost | C | C | tional C | C | tional O | O |

(Note: In TABLE 1, F/O = fully opened, O = opened, and C = closed)

In the vent (VENT) mode, the vent door 23 is open and the defrost door 22 and the foot doors 24a, 24b are closed. When the air in the right side of the vehicle passenger compartment is conditioned under the "MAX VENT" while the air in the left side of the vehicle passenger compartment is conditioned under the "TEMPERATURE CONTROL MODE", the right bypass door 18a is fully open and the left bypass door 18b is closed. Consequently, on the right side of the air conditioner, the air that has passed through the cooling heat exchanger 12 flows partly through the heating heat exchanger 13 and partly through the bypass passage 16a and thereafter it is fed to the upper air outlet 20. On the left side of the air conditioner, the air that has passed through the cooling heat exchanger 12 flows exclusively through the heating heat exchanger 13 during which time it is conditioned to a desired temperature. The temperature-controlled air is fed to the upper air outlet 20.

In the bi-level (B/L) mode, the vent door 23 is open and the defrost door 22 is closed. Then the foot doors 24a, 24b are opened to set the degree of which each of the lower air outlets 21a, 21b is open. In this instance, the bypass doors 18a, 18b and the foot doors 24a, 24b can be located optionally at any desired positions. With this arrangement, part of the air that has passed through the heating heat exchanger 13 is guided by the foot doors 24a, 24b into the corresponding ones of the lower air outlets 21a, 21b, and the rest of the air is guided toward the upper portions of the respective air distribution chambers 17a, 17b where the air is mixed with the air that has passed through the bypass passages 18a, 18b. Then the thus mixed air is fed to the upper air outlet 20. It appears clear from the foregoing description that the temperature of the air fed toward the upper portion of each air distribution chamber 17a, 17b and the temperature of the air fed toward the lower portion of each air distribution chamber 17a, 17b can be controlled independently of each other by adjusting the position of one of the bypass doors 18a, 18b and the position of one of the foot doors 24a, 24b in the corresponding air flow passages 3a, 3b.

In the heat (HEAT) mode, the bypass doors 18a, 18b, the vent door 23 and the defrost door 22 are closed and the foot doors 24a, 24a assume the fully opened position. In this instance, the aforementioned independent control of the right and left sides of the passenger compartment is not possible partly because the blowers 10a, 10b are driven by the same electric motor 11 and partly because the heat exchangers 12, 13 are used commonly for the air flow passages 3a, 3b. When such independent control is desired then, the bypass doors 18a, 18b and the foot doors 24a, 24b are displaced to desired positions.

In the defrost/heat (DEF/HEAT) mode, the defrost door 22 and the foot doors 24a, 24b are open and the vent door 23 is closed. The bypass doors 18a, 18b and the foot doors 24a, 24b are optionally set in desired open positions whereupon the air heated by the heating heat exchanger 13 is separated by the foot doors 24a, 24b into two parts. That is, part of the air is delivered upwardly to the defrost air outlet 19 and the remainder is delivered downwardly to the lower air outlets 21a, 21b. The air passed through the bypass passages 16a, 16b, in an amount dependent on the degree to which the bypass passages 16a, 16b are open, is fed to the defrost air outlet 19. In this mode of operation, the temperature distribution in a vertical direction of the air distribution chambers 17a, 17b can be controlled with respect to each of the air flow passages 3a, 3b.

In the defrost (DEF) mode, the bypass doors 18a, 18b, vent door 23 and the foot doors 24a, 24b are closed and the defrost door 22 is open. Similar to the aforesaid heat mode, the independent temperature control of the right side and the leftside of the passenger compartment cannot be achieved in this case. However, if such independent temperature control is required, then the bypass doors 18a, 18b are displaced.

Figure 3:
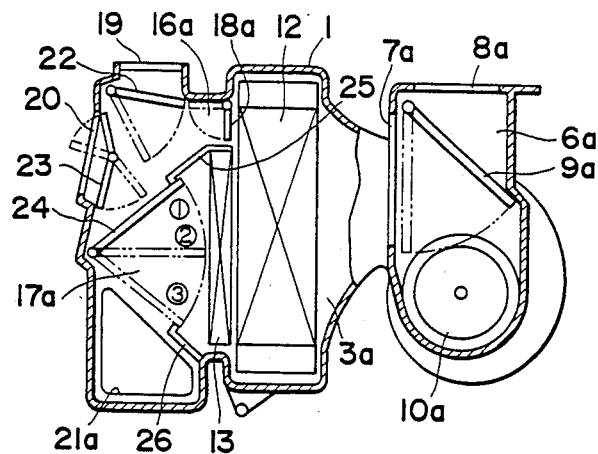
FIG. 3 is a view similar to FIG. 2, but showing another embodiment.
Figure 4:
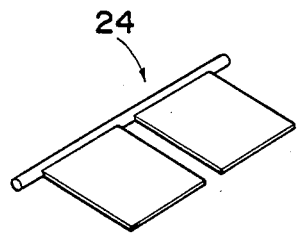
FIG. 4 is a perspective view illustrative of air mix doors of the air conditioner shown in FIG. 3.
Figure 5:
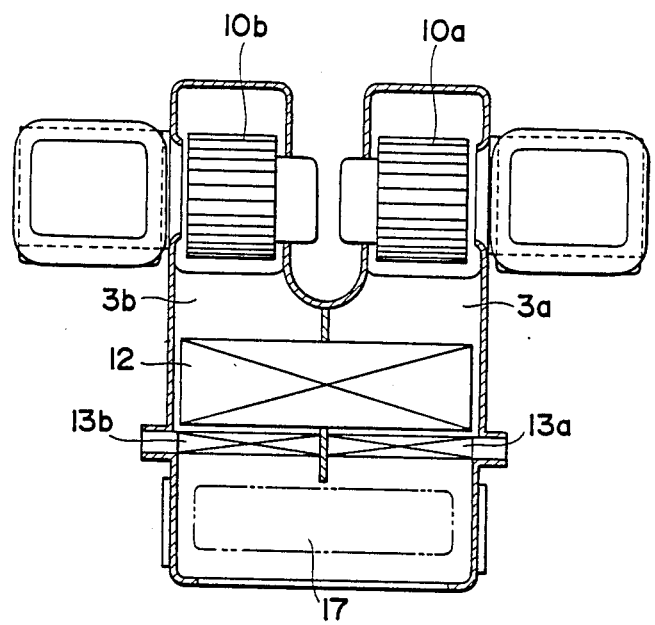
FIG. 5 is a horizontal cross-sectional view of an air conditioner according to the related art.
Figure 6:
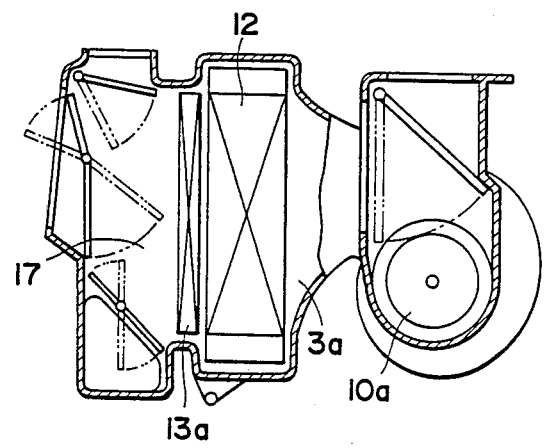
FIG. 6 is a vertical cross-sectional view of the air conditioner shown in FIG. 5.

FIGS. 3 and 4 show a second embodiment of the present invention which is substantially identical with the first embodiment described above with the exception that there is provided a foot door assembly 24 having a pair of laterally spaced door sections joined at one end with a shaft so that the door sections are movable in unison with each other between a first stationary position at which the door sections contact an upper guide plate 25 extending obliquely downwardly from the upper edge of the heating heat exchanger 13 to thereby divide the air distributing chamber 17 into an upper portion and a lower portion, a second stationary position at which the door sections lie in a horizontal plane to divide the respective air distribution chambers 17a, 17b vertically into upper and lower portions disposed on opposite sides of a horizontal center line of the heating heat exchanger 13, and a third stationary position at which the door sections contact a lower guide 26 extending obliquely upwardly from the bottom wall of the casing 1 to close the lower air outlets 21a, 21b. The foot door 24 thus constructed serves as an air distribution door to distribute the air in a vertical direction of the air distribution chambers 17a, 17b after the air has passed through the heating heat exchanger 13.

During operation, the blowers 10a, 10b are driven to cause the recirculated air or the outside air to be drawn into the air passage through the air inlets 7a, 7b or the air inlets 8a, 8b which are selected by the changeover doors 9a, 9b. The air drawn into the right air flow passage 3a and the air drawn into the left air flow passage 3b is then forced by the respective blowers 10a, 10b to flow downstream along the air passages 3a, 3b without being mixed with each other and through the cooling heat exchanger 12 and the heating heat exchanger 13 and/or the bypass passages 16a, 16b into the air distribution chambers 17a, 17b. Thereafter, the air departing from the right air flow passage 3a is discharged from the right side of the air conditioner into the vehicle passenger compartment through at least one of the air outlets 19, 20, 21a depending on the selected operation mode while the air departing from the left air flow passage 3b is discharged from the left side of the air conditioner into the passenger compartment through at least one of the air outlets 19, 20, 21b depending on the selected operation mode.

Since the blowers 10a, 10b and the bypass doors 18a, 18b disposed in one air flow passage 3a, 3b are operable independently of the blower and the bypass door disposed in the other air flow passage, the air conditioner of this embodiment is capable of operating in various modes as shown in the following Table 2.

TABLE 2

| Mode<br>Door | VENT | | B/L | | HEAT | DEF/HEAT | DEF |
| --- | --- | --- | --- | --- | --- | --- | --- |
| | MAX VENT | TEM. CONT.<br>MODE | COOL<br>MODE | EVEN TEM.<br>MODE | | | |
| Bypass | F/O | C | O | Optional | C | Optional | C |
| Vent | O | O | O | O | C | C | C |
| Defrost | C | C | C | C | C | O | O |
| Foot | 3rd | 3rd | 1st | 2nd | 1st | 2nd | 3rd |

(Note:
In TABLE 1, F/O = fully opened, O = opened, and C = closed, 1st-3rd = first stationary position-third stationary position)

In the vent (VENT) mode, the vent door 23 is open and the defrost door 22 is closed. The foot door 24 is disposed in the third stationary position. When the air in the right side of the vehicle passenger compartment is conditioned under the "MAX VENT" while the air in the left side of the vehicle passenger compartment is conditioned under the "TEMPERATURE CONTROL MODE", then the right bypass door 18a is completely open and the left bypass door 18b is closed. Consequently, on the right side of the air conditioner, the air that has passed through the cooling heat exchanger 12 flows partly through the heating heat exchanger 13 and partly through the bypass passage 16a and thereafter it is fed to the upper air outlet 20. On the left side of the air conditioner, the air that has passed through the cooling heat exchanger 12 flows exclusively through the heating heat exchanger 13 during which time it is conditioned to a desired temperature. The temperature-controlled air is fed to the upper air outlet 20.

In the bi-level (B/L) mode, the vent door 23 is open and the defrost door 22 is closed. When a cool mode is selected, then the bypass doors 18a, 18b are opened and the foot door 24 is set to the second stationary position. Alternately, when an even temperature mode is selected, the foot door 24 is set to the second stationary position and the bypass doors 18a, 18b are disposed optionally in any desired positions. In the cool mode, the air that has passed through the heating heat exchanger 13 is delivered exclusively to the lower air outlets 21a, 21b. The proportion of the cooled air is dependent on the degree to which the bypass passages 16a, 16b are open. In this cool mode, there is a great temperature difference in the air as taken in the vertical direction of the heat exchanger. On the other hand, in the even temperature mode, the air that has passed through the heating heat exchanger 13 is divided by the foot door 24 such that half of the air is guided downwardly to the lower air outlets 21a, 21b. The remainder is guided to the upper portions of the respective air distribution chambers 17a, 17b from which it is fed to the upper air outlet 20 together with the air that has passed through the bypass passages 18a, 18b. Even when the foot door 24 is located at the same position, the temperature of air to be fed to the upper portion of each air distribution chamber 17a, 17b can be regulated by controlling the corresponding bypass doors 18a, 18b in the air flow passages 3a, 3b. Further, the temperature of air to be fed to the lower portion of each air distribution chamber 17a, 17b can be regulated by controlling the speed of rotation of the corresponding blowers 10a, 10b in the air flow passages 3a, 3b. Thus, in this even temperature mode, the temperature difference produced in the vertical direction is negligible or small.

In the heat (HEAT) mode, the bypass doors 18a, 18b, the vent door 23 and the defrost door 22 are closed and the foot door 24 is disposed in the first stationary position. In this instance, the blowers 10a, 10b are driven to rotate at different speeds to thereby blow off the air from the lower air outlets 21a, 21b at different temperatures.

In the defrost/heat (DEF/HEAT) mode, the defrost door 22 is open and the vent door 23 is closed. The foot door 24 is disposed in the second stationary position. The bypass doors 18a, 18b are optionally set in desired open positions whereupon the air heated by the heating heat exchanger 13 is separated by the foot door 24 into two substantially similar parts. That is, part of the air is delivered upwardly to the defrost air outlet 19 and the remainder is delivered downwardly to the lower air outlets 21a, 21b. The air that has passed through the bypass passages 16a, 16b, in an amount dependent on the degree to which the bypass passages 16a, 16b is open is fed to the defrost air outlet 19. In this mode of operation, the temperature of air to be fed to the defrost air outlets 19 can be regulated by controlling the bypass doors 18a, 18b. On the other hand, the temperature of air to be fed to the lower air outlets 21a, 21b can be regulated by controlling the speed of rotation of the individual blowers 10a, 10b.

In the defrost (DEF) mode, the bypass doors 18a, 18b and the vent door 23 are closed and the defrost door 22 is open with the foot door 24 disposed in its third stationary position. All of the air that has passed through the cooling heat exchanger 12 is introduced into the heating heat exchanger 13 where the air is conditioned at the desired temperature. Then the temperature-controlled air is fed to the defrost air outlet 19. Similar to the heat mode, the temperature of air discharged from the right side of the defrost air outlet 19 and the temperature of air discharged from the left side of the defrost air outlet 19 can be controlled independently of each other by regulating the speed of rotation of the individual blowers 10a, 10b.

It is possible according to the invention to provide an additional air distribution door. However, it is preferred that an additional door be used in common with the foot door 24 or with foot doors 24a, 24b to achieve the advantages associated with having simple construction.

Although in the illustrated embodiments, the defrost door 22 and the vent door 23 are disposed separately from one another, they may be replaced with a single door operative to select one of the defrost air outlet 19 and the upper air outlet 20.

Obviously, various modifications and variations of the present invention are possible in the light of the above teachings. It is therefore to be understood that within the scope of the appended claims the invention may be practiced otherwise than as specifically described.

What is claimed is:

1. An automobile air conditioner comprising:
a casing having an upper side wall and a lower side wall and defining therebetween separated first and second air flow passages through which passages air flows in a flow direction;
a first blower disposed in said first air flow passage for blowing air therethrough in the flow direction;
a second blower disposed in said second air flow passage for blowing air therethrough in the flow direction;
a single motor operatively connected to said first and said second blowers for driving said blowers;
a first heat exchanger disposed in said casing downstream of said blowers with respect to the air flow direction for cooling air passing therethrough, said first heat exchanger extending across said first and said second air flow passages;
a second heat exchanger disposed in said casing downstream from, with respect to said air flow direction, and adjacent to said first heat exchanger for heating air passing therethrough,
said second heat exchanger extending across said first and said second air flow passages, being adjacent the lower side wall of the casing, and spaced from the upper side wall of said casing,
first and second bypass passages defined between said second heat exchanger and the upper side wall of said casing in said air flow passages, respectively, said bypass passages each aligned with a portion of said first heat exchanger as taken in said flow direction;
a first bypass door disposed in said first bypass passage for regulating the amount of air blown by said first blower through said first heat exchanger that flows through said first bypass passage;
a second bypass door disposed in said second bypass passage for regulating the amount of air blown by said second blower through said first heat exchanger that flows through said second bypass passage,
said first and said second bypass doors being operable to regulate the amount of air flowing through said respective bypass passages independently of one another;
a first air distribution chamber defined by said casing contiguous to said first air flow passage downstream of said second heat exchanger with respect to the flow direction;
a second air distribution chamber defined by said casing separate from said first air distribution chamber and contiguous to said second air flow passage downstream of said second heat exchanger with respect to the flow direction,
each of said air distribution chambers having an upper portion in which an upper air outlet means is defined and a lower portion in which a lower air outlet is defined,
the upper portion of each of said air distribution chambers open to said bypass passages, respectively;
a first air distribution door movably mounted to said casing and movable within said first air distribution chamber between a first position at which the upper portion of said first air distribution chamber is closed to said second heat exchanger while the lower portion of said first air distribution chamber is open to said second heat exchanger and closed to said first bypass passage by the first air distribution door, a second position at which both the upper and the lower portions of the first air distribution chamber are open to said second heat exchanger while the lower portion of said first air distribution chamber is closed to said first bypass passage by the first air distribution door and a third position at which the lower portion of said first air distribution chamber is closed to said second heat exchanger and said first bypass passage while the upper portion of said first air distribution chamber is open to said second heat exchanger by the first air distribution door; and
a second air distribution door movably mounted to said casing and movable within said second air distribution chamber between a first position at which the upper portion of said second air distribution chamber is closed to said second heat exchanger while the lower portion of said second air distribution chamber is open to said second heat exchanger and closed to said second bypass passage by the second air distribution door, a second position at which both the upper and the lower portions of the second air distribution chamber are open to said second heat exchanger while the lower portion of said second air distribution chamber is closed to said second bypass passage by the second air distribution door, and a third position at which the lower portion of said second air distribution chamber is closed to said second heat exchanger and said second bypass passage while the upper portion of said second air distribution chamber is open to said second heat exchanger by the second air distribution door.

2. An automobile air conditioner as claimed in claim 1, wherein said first and said second air distribution doors are movable to the positions thereof independently of one another.

3. An automobile air conditioner as claimed in claim 1, wherein said first and said second air distribution doors are operatively connected to move to the respective positions thereof in unison with one another.

4. An automobile air conditioner as claimed in claim 1, wherein each said upper air outlet means includes a vent opening and a defrost outlet opening.

* * * * *